(12) United States Patent
Zhou et al.

(10) Patent No.: US 12,254,680 B2
(45) Date of Patent: Mar. 18, 2025

(54) TRAFFIC FLOW MACHINE-LEARNING MODELING SYSTEM AND METHOD APPLIED TO VEHICLES

(71) Applicant: NIO TECHNOLOGY (ANHUI) CO., LTD, Hefei (CN)

(72) Inventors: Ping Zhou, Hefei (CN); Siwei Peng, Hefei (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 342 days.

(21) Appl. No.: 17/724,228

(22) Filed: Apr. 19, 2022

(65) Prior Publication Data

US 2022/0343637 A1    Oct. 27, 2022

(30) Foreign Application Priority Data

Apr. 26, 2021 (CN) .......................... 202110453305.8

(51) Int. Cl.
*G06V 10/80* (2022.01)
*G06V 10/762* (2022.01)
(Continued)

(52) U.S. Cl.
CPC .......... *G06V 10/803* (2022.01); *G06V 10/762* (2022.01); *G06V 20/588* (2022.01); *G01S 13/867* (2013.01)

(58) Field of Classification Search
CPC .. G06V 10/803; G06V 10/762; G06V 20/588; G06V 20/54; G01S 13/867;
(Continued)

(56) References Cited

U.S. PATENT DOCUMENTS 9,707,961 B1 * 7/2017 Halder .............. B60W 50/0097
2011/0006913 A1 * 1/2011 Chen ...................... G08G 1/161
340/902
(Continued)

FOREIGN PATENT DOCUMENTS

CN    109858460    *  6/2019    ............... G06K 9/00
CN    110471411    * 11/2019    ............... G05D 1/02

OTHER PUBLICATIONS

Extended Search Report for European Patent Application No. 22165470.0, dated Sep. 2, 2022, 7 pages.
(Continued)

*Primary Examiner* — Amara Abdi
(74) *Attorney, Agent, or Firm* — Sheridan Ross P.C.

(57) ABSTRACT

The invention relates to a traffic flow machine-learning modeling system and method applied to vehicles. The system includes: a target fusion module configured to perform target fusion on radar measurement data and camera measurement data, and output target attribute information; a lane line model module configured to output an original lane line model based on the camera measurement data; a target selection module configured to determine a position of a lane where each target is located based on the target attribute information output by the target fusion module and the original lane line model output by the lane line model module, and output the target; and a traffic flow calculation module configured to model the vehicle position by using a clustering algorithm based on the output of the target fusion module, the output of the target selection module, and the output of the lane line model module, and output a traffic flow-based lane line model. According to the invention, accurate lane line parameters can be obtained, and related lane flow characteristic information can be provided.

13 Claims, 1 Drawing Sheet

(51) Int. Cl.
*G06V 20/56* (2022.01)
*G01S 13/86* (2006.01)

(58) Field of Classification Search
CPC .. G08G 1/0129; G08G 1/0133; G08G 1/0112;
G08G 1/0125; G08G 1/0137; G06F 18/23
See application file for complete search history.

(56) References Cited

U.S. PATENT DOCUMENTS

| 2017/0217433 | A1* | 8/2017  | Halder | G05D 1/024  |
| 2018/0170388 | A1* | 6/2018  | Shin   | B60W 60/001 |
| 2018/0178785 | A1* | 6/2018  | Lin    | G06V 10/754 |
| 2022/0375234 | A1* | 11/2022 | Zhang  | G06V 10/44  |

OTHER PUBLICATIONS

Official Action with Machine Translation for China Patent Application No. 202110453305.8, dated Aug. 17, 2024, 14 pages.

\* cited by examiner

TRAFFIC FLOW MACHINE-LEARNING MODELING SYSTEM AND METHOD APPLIED TO VEHICLES

CROSS-REFERENCE TO RELATED APPLICATION

This application claims the benefit of China Patent Application No. 202110453305.8 filed on Apr. 26, 2021, the entire contents of which are incorporated herein by reference in its entirety.

TECHNICAL FIELD

The invention relates to autonomous driving technologies, and in particular, to a traffic flow machine-learning modeling system and traffic flow machine-learning modeling method applied to vehicles.

BACKGROUND ART

Traffic flow refers to the movement of vehicles running in a transport network. The current research on traffic flow mainly focuses on mathematical statistics of traffic conditions, such as the probability distribution of speed, traffic volume, traffic density, queue length, and waiting time. The status of traffic flow has an impact on every vehicle on a road.

Autonomous vehicles lead the future development trend, and more and more vehicles may have advanced driver assistance systems (ADAS) and an autonomous driving function. With the development of autonomous vehicles, if more accurate traffic flow information can be provided, the accuracy of autonomous driving technology can be improved. For example, anomalies may be identified from the traffic flow information as early as possible, some control functions may be performed on vehicles, or warning information may be issued to drivers.

SUMMARY OF THE INVENTION

In view of the above problem, the invention is intended to provide a traffic flow machine-learning modeling system and traffic flow machine-learning modeling method applied to vehicles, which can provide more accurate traffic flow information.

An aspect of the invention provides a traffic flow machine-learning modeling system applied to vehicles. The system includes:
- a target fusion module configured to perform target fusion on radar measurement data from a vehicle radar and camera measurement data from a vehicle camera, and output target attribute information;
- a lane line model module configured to output an original lane line model based on the camera measurement data from the vehicle camera;
- a target selection module configured to determine a position of a lane where each target is located based on the target attribute information output by the target fusion module and the original lane line model output by the lane line model module, and output the target; and
- a traffic flow calculation module configured to model the vehicle position by using a clustering algorithm based on the output of the target fusion module, the output of the target selection module, and the output of the lane line model module, and output a traffic flow-based lane line model.

Optionally, in the traffic flow calculation module, a DBSCAN algorithm is used as the clustering algorithm.

Optionally, in the target fusion module, a distance between vehicles is output as the target attribute information; and in the traffic flow calculation module, a vehicle density-based vehicle stream shape is output as a clustering result by using the distance between vehicles output by the target fusion module as a basis for clustering, and the lane line model is generated based on the vehicle stream shape.

Optionally, the traffic flow calculation module further outputs traffic flow characteristic information.

Optionally, the traffic flow characteristic information includes one or more of the following:
an average speed of vehicles in traffic flow, a maximum speed of the vehicles in the traffic flow, and a minimum speed of the vehicles in the traffic flow.

Optionally, the DBSCAN algorithm includes the following steps:
based on an input distance between vehicles, abstracting a vehicle into a point, and clustering the vehicles, to output a cluster;
finding out principal direction of the cluster by using a principal component analysis algorithm; and
solving a quartic regression equation by using a least square method for each cluster, where coefficients of the quartic regression equation are lane line parameters.

Optionally, the clustering the vehicles includes:
(1) randomly selecting a data object point p from a data set;
(2) if the selected data object point p for parameters Eps and MinPts is a core point, finding out all data object points density-reachable from p to form a cluster;
(3) if the selected data object point p is an edge point, selecting another data object point; and
(4) repeating steps (2) and (3) until all points are processed,
where the parameter Eps represents a radius of a neighborhood, and the parameter MinPts represents a threshold of a number of data objects in the neighborhood.

An aspect of the invention provides a traffic flow machine-learning modeling method applied to vehicles. The method includes:
a target fusion step for performing target fusion on radar measurement data from a vehicle radar and camera measurement data from a vehicle camera, and outputting target attribute information;
a lane line model step for outputting an original lane line model based on the camera measurement data from the vehicle camera;
a target selection step for determining a position of a lane where each target is located based on the target attribute information output in the target fusion step and the original lane line model output in the lane line model step, and outputting the target; and
a traffic flow calculation step for modeling the vehicle position by using a clustering algorithm based on the output in the target fusion step, the output in the target selection step, and the output in the lane line model step, and outputting a traffic flow-based lane line model.

Optionally, in the traffic flow calculation step, a DBSCAN algorithm is used as the clustering algorithm.

Optionally, in the target fusion step, a distance between vehicles is output as the target attribute information; and in the traffic flow calculation step, a vehicle density-based vehicle stream shape is output as a clustering result by using the distance between vehicles output in the target fusion step as a basis for clustering, and the lane line model is generated based on the vehicle stream shape.

Optionally, traffic flow characteristic information is further output in the traffic flow calculation step.

Optionally, the traffic flow characteristic information includes one or more of the following:

an average speed of vehicles in traffic flow, a maximum speed of the vehicles in the traffic flow, and a minimum speed of the vehicles in the traffic flow.

Optionally, the DBSCAN algorithm includes the following steps:

based on an input distance between vehicles, abstracting a vehicle into a point, and clustering the vehicles, to output a cluster;

finding out principal direction of the cluster by using a principal component analysis algorithm; and solving a quartic regression equation by using a least square method for each cluster, where coefficients of the quartic regression equation are lane line parameters.

Optionally, the clustering the vehicles includes:

(1) randomly selecting a data object point p from a data set;

(2) if the selected data object point p for parameters Eps and MinPts is a core point, finding out all data object points density-reachable from p to form a cluster;

(3) if the selected data object point p is an edge point, selecting another data object point; and (4) repeating steps (2) and (3) until all points are processed, where the parameter Eps represents a radius of a neighborhood, and the parameter MinPts represents a threshold of a number of data objects in the neighborhood.

An aspect of the invention provides a vehicle, including the traffic flow machine-learning modeling system applied to vehicles.

An aspect of the invention provides a computer-readable medium having a computer program stored thereon, where when the computer program is executed by a processor, the traffic flow machine-learning modeling method applied to vehicles is implemented.

An aspect of the invention provides a computer device, which includes a storage module, a processor, and a computer program stored on the storage module and executable on the processor, where the processor implements the traffic flow machine-learning modeling method applied to vehicles when executing the computer program.

As mentioned above, according to the traffic flow machine-learning modeling system and the traffic flow machine-learning modeling method of the invention, accurate lane line parameters can be obtained by using the DBSCAN clustering algorithm, and accurate lane line parameters can be provided particularly in a scenario where the lane line model module cannot provide an accurate lane line model.

Further, according to the traffic flow machine-learning modeling system and the traffic flow machine-learning modeling method of the invention, traffic flow characteristics can also be provided, for example, an average speed in terms of different lanes, the actions of slowdown and rapid deceleration of vehicles in the traffic flow can be monitored, the result of which may be used as a basis for route planning, and warning information is issued to give a reminder to the driver, or control operations such as speed reduction and lane changing are performed on the present vehicle. In this way, more assistance can be provided for autonomous driving technology, thereby implementing accurate control over the vehicle.

DETAILED DESCRIPTION OF EMBODIMENTS

Some of the embodiments of the invention are described below and are intended to provide a basic understanding of the invention. They are not intended to confirm key or decisive elements of the invention or limit the scope of protection.

For concise and illustrative purposes, this specification mainly describes the principles of the invention with reference to its exemplary embodiments. However, those skilled in the art will readily recognize that the same principles can be equivalently applied to all types of traffic flow machine-learning modeling systems and traffic flow machine-learning modeling methods applied to vehicles, and these same principles can be implemented therein, and any such changes do not depart from the true spirit and scope of this patent application.

In addition, in the following description, reference is made to the accompanying drawings, which illustrate specific exemplary embodiments. Electrical, mechanical, logical, and structural changes can be made to these embodiments without departing from the spirit and scope of the invention. Furthermore, although the features of the invention are disclosed in combination with only one of several implementations/embodiments, if any given or recognizable function may be desired and/or advantageous, this feature can be combined with one or more other features of other implementations/embodiments. Therefore, the following description should not be considered in a limiting sense, and the scope of the invention is defined by the appended claims and their equivalents.

The terms such as "have" and "include" indicate that in addition to the units (modules) and steps that are directly and clearly described in the specification and the claims, other units (modules) and steps that are not directly or clearly described are not excluded in the technical solutions of the invention.

Figure 1:
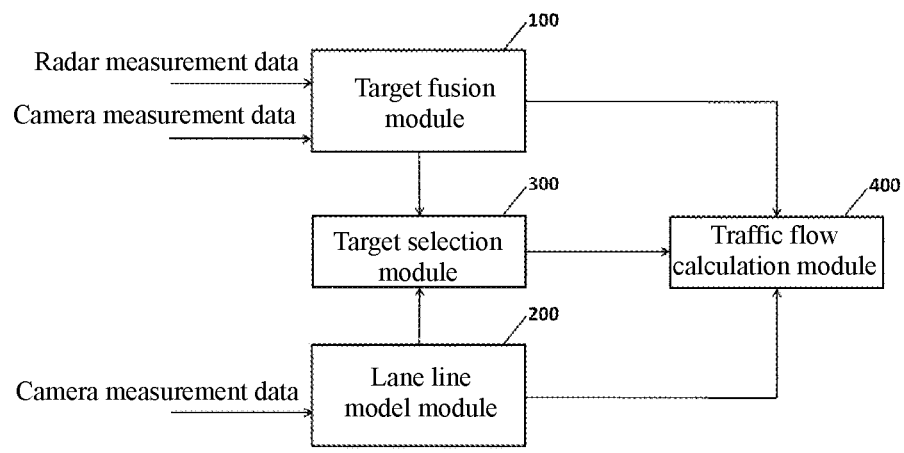
FIG. 1 is a schematic diagram representing the construction of a traffic flow machine-learning modeling system applied to vehicles according to an implementation of the invention.

FIG. 1 is a schematic diagram representing the construction of a traffic flow machine-learning modeling system applied to vehicles according to an implementation of the invention.

As shown in FIG. 1, the traffic flow machine-learning modeling system applied to vehicles according to an implementation of the invention includes:

a target fusion module 100 configured to receive radar measurement data from a vehicle radar and camera measurement data from a vehicle camera, perform target fusion, and output target attribute information, including for example: information about a target and a lane line model, etc.:

a lane line model module 200 configured to output an original lane line model based on the camera measurement data from the vehicle camera, which specifically involves converting the camera measurement data collected by the camera into lane line parameters, such as distances of the present vehicle from left and right lane lines, and curvatures of lanes;

a target selection module 300 configured to determine a position of a lane where each target is located based on the target attribute information output by the target fusion module 100 and the original lane line model output by the lane line model module 200, and output the target; and a traffic flow calculation module 400 configured to model the vehicle position by using a clustering algorithm based on the outputs of the target fusion module 100, the target selection module 200, and the lane line model module 300, and output a traffic flow-based lane line model.

Here, the target fusion module 100 is configured to fuse target information from multiple sensors to generate more accurate target attributes than a single sensor. In the invention, there is no target fusion logic involved, provided that there is accurate target attribute information. Therefore, an output from a single sensor, or an output of a fusion algorithm may also be possible.

The lane line model module 200 determines, based on the target and the lane line model output by the target fusion module 100, the position of the lane where each target is located, and outputs the targets in a prescribed order. In the invention, the prescribed order is not limited and can be set as required, provided that the lane and front and rear positions of the target can be determined. As an example, the prescribed order is: (1) the nearest target in a current lane; (2) the second nearest target in the current lane; (3) the nearest target in a left lane; (4) the second nearest target in the left lane; (5) the nearest target in a right lane; and (6) the second nearest target in the right lane.

A main function of the lane line model module 200 is to convert a lane image seen by the camera into the lane line parameters, such as the distances of the present vehicle from the left and right lane lines, and the curvatures of the lanes, so as to obtain the original lane line model.

The traffic flow calculation module 400 models the vehicle position by using the clustering algorithm based on the outputs of the target fusion module 100, the target selection module 200, and the lane line model module 300, and outputs the traffic flow-based lane line model, and may also calculate traffic flow characteristics. Here, a DBSCAN clustering algorithm is preferably used as the clustering algorithm applied in the traffic flow calculation module 400, because the DBSCAN algorithm does not require the number of clusters to be specified, whereas other clustering algorithms (such as K-means, and K-median) require the number of clusters to be specified. In actual scenarios, the number of clusters cannot be predicted in advance, and therefore, the DBSCAN algorithm is preferred.

Next, the specific process of calculation using the DBSCAN algorithm is described.

Density-based spatial clustering of applications with noise (DBSCAN) is a relatively effective density-based clustering algorithm. It defines a cluster as the largest collection of density-connected points, can divide regions of high enough density into a cluster, and can discover clusters of arbitrary shapes from a spatial database containing noise.

DBSCAN requires two parameters: eps and the minimum number of points required to form a high-density region (minPts). DBSCAN starts with an arbitrary point that has not been visited. This point's eps-neighborhood is then retrieved, and if the eps-neighborhood contains enough points, a new cluster is built, otherwise, this point is labeled as noise. If a point is in a dense region of a cluster, points within the eps-neighborhood of this point are also in the cluster. When the new points are added to the cluster, if it (they) is also in the dense region, points within its (their) eps-neighborhood are also be added to the cluster. This process repeats until no more points can be added, such that a density-connected cluster is completely found. Then, an unvisited point is retrieved, leading to the discovery of a new cluster or noise. DBSCAN has the advantages that clusters of arbitrary shapes can be discovered without the need to manually specify the number of clusters, and there is a mechanism to deal with outliers.

In the invention, by using the distance between vehicles (the distance between vehicles is provided by the target fusion module 100) as the basis for clustering, the density-based vehicle stream shape is finally obtained, a lane shape can be obtained based on the vehicle stream shape, and the information such as the average speed in the traffic flow, and the maximum/minimum speed of the vehicles in the traffic flow can also be calculated.

Figure 2:
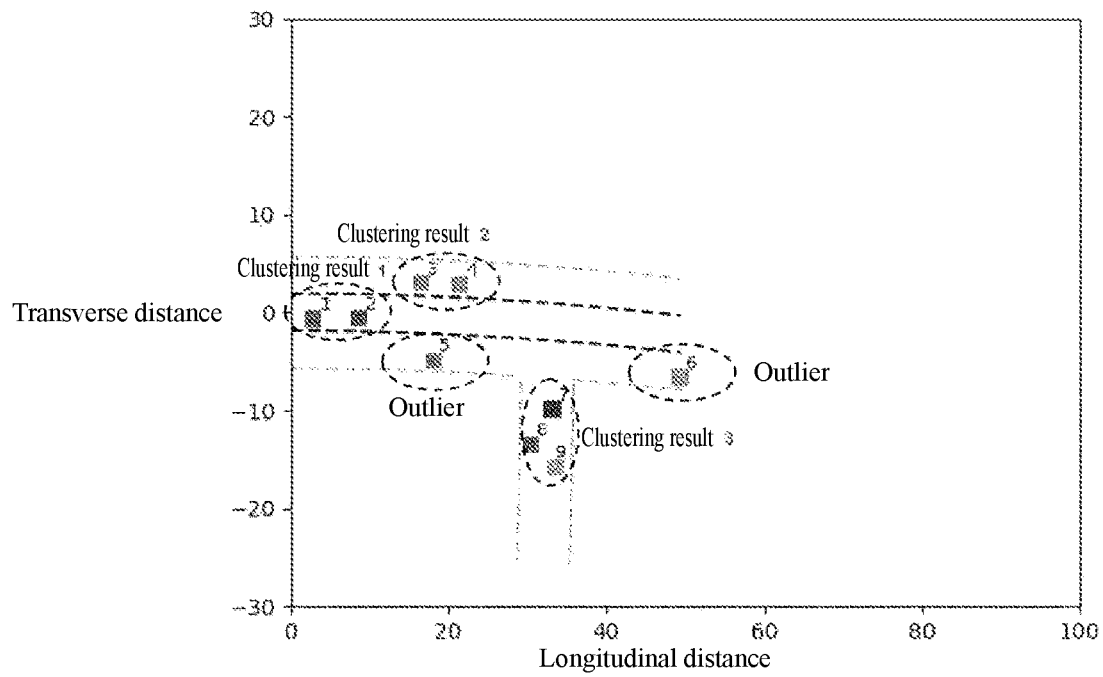
FIG. 2 is a schematic diagram representing a clustering algorithm used in the invention.

FIG. 2 is a schematic diagram representing a clustering algorithm used in the invention.

As shown in FIG. 2, the horizontal axis identifies a longitudinal distance, the vertical axis identifies a transverse distance, and squares with numerals in FIG. 2 represent vehicles ahead detected by a camera or a radar, which vehicles can be classified into the following three clustering results using a DBSCAN algorithm based on distances between the vehicles: a clustering result 1 incorporating vehicle 1 and vehicle 2; a clustering result 2 incorporating vehicle 3 and vehicle 4; and a clustering result 3 incorporating vehicle 7, vehicle 8, and vehicle 9. In addition, vehicle 5 and vehicle 6 are outliers.

By continuously collecting data and based on the clustering result, the lane line parameters can be inferred, which can also be compared with the output of the lane line model module 200, such that the accuracy of the lane line model is improved, and some pieces of status information that the lane line model module 200 cannot provide can be provided. For example, as an example, information of whether the lane is passable is provided. Specifically, if there is a cluster of vehicle streams in a lane, it means that the lane is passable. This is merely an example here, and other status information can also be provided according to specific situations.

Next, the specific content of the DBSCAN algorithm used in the invention is then described.

An input of the DBSCAN algorithm is the distance between vehicles (the distance between vehicles is provided by the target fusion module 100). Here, a vehicle can be abstracted into a point, and an output is a cluster. The calculation process is as follows:

(1) randomly selecting a data object point p from a data set;

(2) if the selected data object point p for parameters Eps and MinPts is a core point, finding out all data object points density-reachable from p to form a cluster;

(3) if the selected data object point p is an edge point, selecting another data object point; and (4) repeating steps (2) and (3) until all points are processed, where the parameter Eps represents a radius of a neighborhood, and the parameter MinPts represents a threshold of a number of data objects in the neighborhood.

After clustering of the vehicles, the principal direction of the cluster is found out by using a principal component analysis (PCA) algorithm, and a quartic regression equation is solved by using a least square method (LS) for each cluster, where coefficients of the quartic regression equation are the lane line parameters.

According to the traffic flow machine-learning modeling system of the invention, accurate lane line parameters can be obtained by using the DBSCAN clustering algorithm. The invention is particularly adapted to a scenario where the lane line model module cannot provide an accurate lane line model in the case of abnormal lane lines, for example, where there is no lane line on a road; lane lines are redrawn many times due to road construction, leaving many old lane lines on a road; there are Chinese or English characters on a road, causing interference with lane line detection; a camera fails to detect lane lines due to weather conditions such as rain, snow, fog, and gale and dust-storm, and in a dark condition; or a camera fails to detect lane lines due to other reasons, such as the camera being blocked, and lane lines failing to be output due to image system hardware or software failure. In such similar situations, accurate lane line parameters can be obtained according to the traffic flow machine-learning modeling system of the invention.

Further, according to the traffic flow machine-learning modeling system of the invention, traffic flow characteristic information can also be further provided, for example, an average speed of vehicles in traffic flow, a maximum speed of the vehicles in the traffic flow, a minimum speed of the vehicles in the traffic flow, etc. By using the DBSCAN clustering algorithm, an average speed of the cluster of vehicle streams in each lane is calculated. If the average vehicle speed is lower than a certain threshold, it can be determined that there is an action of slowdown in the lane. Similarly, average speeds at different times may also be calculated and compared with one another. If a decline in average speed exceeds a certain threshold, it can be determined that there is an action of rapid deceleration in a certain lane. In this way, the action of slowdown or acceleration of the vehicle can be monitored based on the traffic flow characteristic information, and warning information can then be output.

The traffic flow machine-learning modeling system applied to vehicles according to an implementation of the invention is described above. Next, the traffic flow machine-learning modeling method applied to vehicles according to an implementation of the invention is described.

Figure 3:
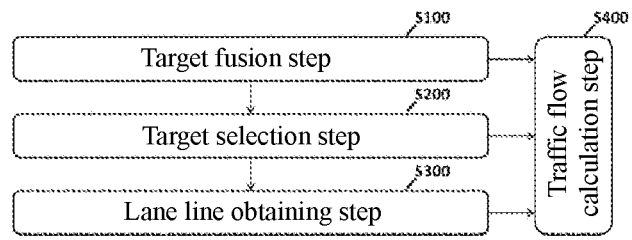
FIG. 3 is a schematic flowchart representing a traffic flow machine-learning modeling method applied to vehicles according to an implementation of the invention.

FIG. 3 is a schematic flowchart representing a traffic flow machine-learning modeling method applied to vehicles according to an implementation of the invention.

As shown in FIG. 3, the traffic flow machine-learning modeling method applied to vehicles according to an implementation of the invention includes:

a target fusion step S100: performing target fusion on radar measurement data from a vehicle radar and camera measurement data from a vehicle camera, and outputting target attribute information;

a lane line obtaining step S200: outputting an original lane line model based on the camera measurement data from the vehicle camera;

a target selection step S300: determining a position of a lane where each target is located based on the target attribute information output in the target fusion step and the original lane line model output in the lane line obtaining step, and outputting the target; and a traffic flow calculation step S400: modeling the vehicle position by using a clustering algorithm based on the output in the target fusion step S100, the output in the lane line obtaining step S200, and the output in the target selection step S300, and outputting a traffic flow-based lane line model.

In the traffic flow calculation step S400, a DBSCAN algorithm is used as the clustering algorithm. In the target fusion step S100, a distance between vehicles is output as the target attribute information, such that in the traffic flow calculation step S400, a vehicle density-based vehicle stream shape is output as a clustering result by using the distance between vehicles output in the target fusion step S100 as a basis for clustering, and the lane line model is generated based on the vehicle stream shape.

Further, traffic flow characteristic information can also be further output in the traffic flow calculation step. The traffic flow characteristic information includes one or more of the following: an average speed of vehicles in traffic flow, a maximum speed of the vehicles in the traffic flow, a minimum speed of the vehicles in the traffic flow, etc.

The DBSCAN algorithm used in the traffic flow calculation step S400 mainly includes the following steps:

based on an input distance between vehicles, abstracting a vehicle into a point, and clustering the vehicles, to output a cluster;

finding out principal direction of the cluster by using a principal component analysis algorithm; and solving a quartic regression equation by using a least square method for each cluster, where coefficients of the quartic regression equation are lane line parameters.

Here, the "clustering the vehicles" includes:

(1) randomly selecting a data object point p from a data set;

(2) if the selected data object point p for parameters Eps and MinPts is a core point, finding out all data object points density-reachable from p to form a cluster;

(3) if the selected data object point p is an edge point, selecting another data object point; and (4) repeating steps (2) and (3) until all points are processed, where the parameter Eps represents a radius of a neighborhood, and the parameter MinPts represents a threshold of a number of data objects in the neighborhood.

As mentioned above, according to the traffic flow machine-learning modeling system and the traffic flow machine-learning modeling method of the invention, accurate lane line parameters can be obtained by using the DBSCAN clustering algorithm, and accurate lane line parameters can be provided in a scenario where the lane line model module cannot provide an accurate lane line model. Further, according to the traffic flow machine-learning modeling system and the traffic flow machine-learning modeling method of the invention, traffic flow characteristics can also be provided, for example, an average speed in terms of different lanes, the actions of slowdown and rapid deceleration of vehicles in the traffic flow can be monitored, the result of which may be used as a basis for route planning, and warning information is issued to give a reminder to the driver, or control operations such as speed reduction and lane changing are performed on the present vehicle. In this way, more assistance can be provided for autonomous driving technology, thereby implementing accurate control over the vehicle.

Still further, the invention further provides a vehicle, which includes the traffic flow machine-learning modeling system applied to vehicles.

The invention further provides a computer-readable medium having a computer program stored thereon, where when the computer program is executed by a processor, the traffic flow machine-learning modeling method applied to vehicles is implemented.

The invention further provides a computer device, which includes a storage module, a processor, and a computer program stored on the storage module and executable on the processor, where the processor implements the traffic flow machine-learning modeling method applied to vehicles when executing the computer program.

The above examples mainly illustrate the traffic flow machine-learning modeling system and traffic flow machine-learning modeling method applied to vehicles of the invention. Although only some specific implementations of the invention are described, a person of ordinary skill in the art should understand that the invention may be implemented in many other forms without departing from the essence and scope of the invention. Accordingly, the presented examples and implementations are considered to be illustrative rather than restrictive, and the invention may encompass various modifications and substitutions without departing from the spirit and scope of the invention that are defined by the appended claims.

The invention claimed is:

1. A traffic flow machine-learning modeling system applied to vehicles, the system comprising:
    a target fusion module configured to perform target fusion on radar measurement data from a vehicle radar and camera measurement data from a vehicle camera, and output target attribute information;
    a lane line model module configured to output an original lane line model based on the camera measurement data from the vehicle camera;
    a target selection module configured to determine a position of a lane where each target is located based on the target attribute information output by the target fusion module and the original lane line model output by the lane line model module, and output the target; and
    a traffic flow calculation module configured to model the vehicle position by using a clustering algorithm based on the output of the target fusion module, the output of the target selection module, and the output of the lane line model module, and output a traffic flow-based lane line model,
    wherein in the target fusion module, a distance between vehicles is output as the target attribute information; and
    wherein in the traffic flow calculation module, a vehicle density-based stream shape is output as a clustering result by using the distance between vehicles output by the target fusion module as a basis for clustering, and the traffic flow-based lane line model is generated based on the vehicle density-based stream shape.

2. The traffic flow machine-learning modeling system applied to vehicles according to claim 1, wherein
    in the traffic flow calculation module, a DBSCAN algorithm is used as the clustering algorithm.

3. The traffic flow machine-learning modeling system applied to vehicles according to claim 2, wherein
    the traffic flow calculation module further outputs traffic flow characteristic information.

4. The traffic flow machine-learning modeling system applied to vehicles according to claim 3, wherein
    the traffic flow characteristic information comprises one or more of the following:
    an average speed of vehicles in traffic flow, a maximum speed of the vehicles in the traffic flow, and a minimum speed of the vehicles in the traffic flow.

5. The traffic flow machine-learning modeling system applied to vehicles according to claim 2, wherein
    the DBSCAN algorithm comprises the following steps:
    based on an input distance between vehicles, abstracting a vehicle into a point, and clustering the vehicles, to output a cluster;
    finding out principal direction of the cluster by using a principal component analysis algorithm; and
    solving a quartic regression equation by using a least square method for each cluster, wherein coefficients of the quartic regression equation are lane line parameters.

6. The traffic flow machine-learning modeling system applied to vehicles according to claim 5, wherein
    the clustering the vehicles comprises:
    (1) randomly selecting a data object point p from a data set;
    (2) if the selected data object point p for parameters Eps and MinPts is a core point, finding out all data object points density-reachable from p to form a cluster;
    (3) if the selected data object point p is an edge point, selecting another data object point; and
    (4) repeating steps (2) and (3) until all points are processed,
    wherein the parameter Eps represents a radius of a neighborhood, and the parameter MinPts represents a threshold of a number of data objects in the neighborhood.

7. A traffic flow machine-learning modeling method applied to vehicles, the method comprising:
    a target fusion step for performing target fusion on radar measurement data from a vehicle radar and camera measurement data from a vehicle camera, and outputting target attribute information;
    a lane line model step for outputting an original lane line model based on the camera measurement data from the vehicle camera;
    a target selection step for determining a position of a lane where each target is located based on the target attribute information output in the target fusion step and the original lane line model output in the lane line model step, and outputting the target; and
    a traffic flow calculation step for modeling the vehicle position by using a clustering algorithm based on the output in the target fusion step, the output in the target selection step, and the output in the lane line model step, and outputting a traffic flow-based lane line model,
    wherein in the target fusion step, a distance between vehicles is output as the target attribute information; and
    wherein in the traffic flow calculation step, a vehicle density-based stream shape is output as a clustering result by using the distance between vehicles output in the target fusion step as a basis for clustering, and the traffic flow-based lane line model is generated based on the vehicle density-based stream shape.

8. The traffic flow machine-learning modeling method applied to vehicles according to claim 7, wherein
    in the traffic flow calculation step, a DBSCAN algorithm is used as the clustering algorithm.

9. The traffic flow machine-learning modeling method applied to vehicles according to claim 8, wherein
    traffic flow characteristic information is further output in the traffic flow calculation step.

10. The traffic flow machine-learning modeling method applied to vehicles according to claim 9, wherein
    the traffic flow characteristic information comprises one or more of the following:
    an average speed of vehicles in traffic flow, a maximum speed of the vehicles in the traffic flow, and a minimum speed of the vehicles in the traffic flow.

11. The traffic flow machine-learning modeling method applied to vehicles according to claim 8, wherein
    the DBSCAN algorithm comprises the following steps:

based on an input distance between vehicles, abstracting a vehicle into a point, and clustering the vehicles, to output a cluster;

finding out principal direction of the cluster by using a principal component analysis algorithm; and solving a quartic regression equation by using a least square method for each cluster, wherein coefficients of the quartic regression equation are lane line parameters.

12. The traffic flow machine-learning modeling method applied to vehicles according to claim 11, wherein the clustering the vehicles comprises:

(1) randomly selecting a data object point p from a data set;

(2) if the selected data object point p for parameters Eps and MinPts is a core point, finding out all data object points density-reachable from p to form a cluster;

(3) if the selected data object point p is an edge point, selecting another data object point; and (4) repeating steps (2) and (3) until all points are processed, wherein the parameter Eps represents a radius of a neighborhood, and the parameter MinPts represents a threshold of a number of data objects in the neighborhood.

13. A computer device, comprising a storage module, a processor, and a computer program stored on the storage module and executable on the processor, wherein the processor implements a traffic flow machine-learning modeling method applied to vehicles when executing the computer program, the method comprising:

a target fusion step for performing target fusion on radar measurement data from a vehicle radar and camera measurement data from a vehicle camera, and outputting target attribute information;

a lane line model step for outputting an original lane line model based on the camera measurement data from the vehicle camera;

a target selection step for determining a position of a lane where each target is located based on the target attribute information output in the target fusion step and the original lane line model output in the lane line model step, and outputting the target; and a traffic flow calculation step for modeling the vehicle position by using a clustering algorithm based on the output in the target fusion step, the output in the target selection step, and the output in the lane line model step, and outputting a traffic flow-based lane line model, wherein in the target fusion step, a distance between vehicles is output as the target attribute information; and wherein in the traffic flow calculation step, a vehicle density-based stream shape is output as a clustering result by using the distance between vehicles output in the target fusion step as a basis for clustering, and the traffic flow-based lane line model is generated based on the vehicle density-based stream shape.

* * * * *